US012516561B2

(12) United States Patent
Sorice et al.

(10) Patent No.: US 12,516,561 B2
(45) Date of Patent: Jan. 6, 2026

(54) DOOR SYSTEM WITH INTEGRATED ELECTRIC DEVICES

(71) Applicant: Masonite Corporation, Tampa, FL (US)

(72) Inventors: Cory J. Sorice, La Grange, IL (US); Steven B. Swartzmiller, Batavia, IL (US); Alex Bodurka, Portage, MI (US)

(73) Assignee: Masonite Corporation, Tampa, FL (US)

( * ) Notice: Subject to any disclaimer, the term of this patent is extended or adjusted under 35 U.S.C. 154(b) by 48 days.

(21) Appl. No.: 17/142,467

(22) Filed: Jan. 6, 2021

(65) Prior Publication Data

US 2021/0207420 A1 Jul. 8, 2021

Related U.S. Application Data

(60) Provisional application No. 63/087,528, filed on Oct. 5, 2020, provisional application No. 63/064,056, filed (Continued)

(51) Int. Cl.
*E05F 15/611* (2015.01)
*E05F 15/42* (2015.01)

(52) U.S. Cl.
CPC ............ *E05F 15/611* (2015.01); *E05F 15/42* (2015.01); *E05Y 2201/41* (2013.01);
(Continued)

(58) Field of Classification Search
CPC .... E05F 15/611; E05F 15/42; E05Y 2201/41; E05Y 2400/654; E05Y 2400/66;
(Continued)

(56) References Cited

U.S. PATENT DOCUMENTS 174,040 A 2/1876 Whiteley
612,192 A 10/1898 Chandler
(Continued)

FOREIGN PATENT DOCUMENTS

AU 2020101466 A4 8/2020
CN 200968110 Y 10/2007
(Continued)

OTHER PUBLICATIONS

International Search Report Dated Feb. 23, 2021—Corresponding PCT Application No. PCT/US2021/012289.

(Continued)

*Primary Examiner* — Daniel P Cahn
*Assistant Examiner* — Patrick B. Ponciano
(74) *Attorney, Agent, or Firm* — IceMiller LLP

(57) ABSTRACT

A door system comprises a door frame adapted to be mounted within an opening, a door pivotally attached to the door frame, an AC/DC converter configured to be electrically connected to an AC power unit operably associated with the door system, a slot in the door, a pre-wired receptacle disposed in the slot, and a DC electric device removably disposed in the pre-wired receptacle and electrically connected to the AC/DC converter through the electrical connector of the pre-wired receptacle. The pre-wired receptacle comprises an electrical connector electrically connected the AC/DC converter.

25 Claims, 8 Drawing Sheets

Related U.S. Application Data on Aug. 11, 2020, provisional application No. 62/957,418, filed on Jan. 6, 2020.

(52) U.S. Cl.
CPC ..... *E05Y 2400/654* (2013.01); *E05Y 2400/66* (2013.01); *E05Y 2600/45* (2013.01); *E05Y 2600/452* (2013.01); *E05Y 2800/106* (2013.01); *E05Y 2800/296* (2013.01); *E05Y 2900/132* (2013.01)

(58) Field of Classification Search
CPC ........... E05Y 2600/45; E05Y 2600/452; E05Y 2800/106; E05Y 2800/296; E05Y 2900/132; E05B 2047/0048; E05B 2047/0058; E05B 2047/0059; E05B 47/00; E05B 47/02; E05D 11/0081; E06B 3/70; H02J 7/0042; H02J 9/061
USPC ...................................................... 49/501, 70
See application file for complete search history.

(56) References Cited

U.S. PATENT DOCUMENTS

| | | | | |
|---|---|---|---|---|
| 615,209 | A | 11/1898 | Baxter | |
| 3,355,695 | A | 11/1967 | Overesch | |
| 3,629,972 | A * | 12/1971 | Rehberg | E05F 1/123 49/386 |
| 3,838,234 | A | 9/1974 | Peterson | |
| 3,842,386 | A | 10/1974 | Suska | |
| 3,848,361 | A | 11/1974 | Foster et al. | |
| 3,857,625 | A | 12/1974 | Crane et al. | |
| 3,860,312 | A | 1/1975 | Gordon, Jr. | |
| 4,445,299 | A | 5/1984 | Lehikoinen et al. | |
| 5,212,907 | A * | 5/1993 | Van Sandt | H02G 11/00 439/31 |
| 5,375,374 | A * | 12/1994 | Rohraff, Sr. | E05F 15/63 49/340 |
| 5,531,086 | A * | 7/1996 | Bryant | E05B 63/0004 70/279.1 |
| 5,595,495 | A * | 1/1997 | Johnson | H01R 25/16 174/541 |
| 6,035,676 | A * | 3/2000 | Hudspeth | E05B 47/00 70/279.1 |
| 6,049,287 | A * | 4/2000 | Yulkowski | A62C 2/24 49/31 |
| 6,259,352 | B1 * | 7/2001 | Yulkowski | E05C 17/56 70/277 |
| 6,350,956 | B1 | 2/2002 | Sakata | |
| 6,588,153 | B1 * | 7/2003 | Kowalczyk | E05F 15/63 49/340 |
| 6,812,407 | B1 | 11/2004 | Opperman | |
| 6,891,479 | B1 * | 5/2005 | Eccleston | E05F 15/63 340/545.1 |
| 6,939,179 | B1 * | 9/2005 | Kieffer, Jr. | H01R 27/00 439/724 |
| 7,125,136 | B1 * | 10/2006 | Dedic | G08B 7/062 362/152 |
| 7,696,858 | B2 * | 4/2010 | Groff | E05B 47/0012 70/101 |
| 7,824,200 | B2 | 11/2010 | Bryla et al. | |
| 8,156,671 | B2 | 4/2012 | Presley et al. | |
| 8,169,169 | B2 | 5/2012 | Hass et al. | |
| 8,337,039 | B1 | 12/2012 | Larkin | |
| 8,354,914 | B2 | 1/2013 | Buckingham et al. | |
| 8,448,382 | B2 | 5/2013 | Rodgers et al. | |
| 8,505,169 | B2 | 8/2013 | Wood et al. | |
| 8,772,970 | B2 | 7/2014 | Lambrou | |
| 8,975,518 | B1 * | 3/2015 | Gretz | H02G 1/00 174/559 |
| 9,290,966 | B2 | 3/2016 | Hanchett, Jr. | |
| 9,652,917 | B2 | 5/2017 | Johnson et al. | |
| 9,704,320 | B2 | 7/2017 | Johnson et al. | |
| 9,825,443 | B2 | 11/2017 | Shah et al. | |
| 9,899,819 | B1 * | 2/2018 | Holloway | H01R 9/2675 |
| 9,922,513 | B1 | 3/2018 | Hall et al. | |
| 10,024,096 | B2 * | 7/2018 | Yulkowski | G07C 5/0816 |
| 10,037,636 | B2 | 7/2018 | Ho et al. | |
| 10,043,332 | B2 | 8/2018 | Scalisi et al. | |
| 10,221,609 | B2 * | 3/2019 | Yulkowski | E05F 15/70 |
| 10,361,880 | B1 | 7/2019 | Marcinkowski et al. | |
| 10,453,280 | B2 | 10/2019 | Kontturi | |
| 10,524,332 | B2 * | 12/2019 | Pennycooke | H05B 45/10 |
| 10,664,688 | B2 | 5/2020 | Goulden et al. | |
| 10,691,953 | B2 | 6/2020 | Johnson et al. | |
| 10,733,823 | B2 | 8/2020 | Scalisi | |
| 10,755,509 | B2 | 8/2020 | Saeedi et al. | |
| 10,803,685 | B2 | 10/2020 | Marcinkowski et al. | |
| 10,818,118 | B2 | 10/2020 | Sivalingam et al. | |
| 10,938,250 | B2 | 3/2021 | Ahmed et al. | |
| 10,950,076 | B1 | 3/2021 | Hall et al. | |
| 10,964,138 | B2 | 3/2021 | Geerlings et al. | |
| 10,996,645 | B1 * | 5/2021 | King | H02J 3/14 |
| 10,997,547 | B2 | 5/2021 | Hall et al. | |
| 10,999,092 | B2 | 5/2021 | Marcinkowski et al. | |
| 11,174,666 | B2 | 11/2021 | Demele et al. | |
| 11,189,948 | B1 * | 11/2021 | King | H02G 3/14 |
| 11,244,523 | B1 | 2/2022 | Brady et al. | |
| 11,248,410 | B2 | 2/2022 | Dreyer et al. | |
| 11,290,298 | B2 | 3/2022 | Marcinkowski et al. | |
| 11,339,604 | B2 | 5/2022 | Dreyer | |
| 11,346,141 | B2 | 5/2022 | Gregoriou | |
| 11,346,150 | B1 | 5/2022 | Johnston | |
| 11,352,812 | B2 | 6/2022 | Johnson | |
| 11,373,471 | B2 | 6/2022 | Anderson et al. | |
| D957,688 | S | 7/2022 | Kim et al. | |
| 11,388,373 | B2 | 7/2022 | Scalisi | |
| 11,403,899 | B2 | 8/2022 | Zhang | |
| 11,403,902 | B2 | 8/2022 | Ho et al. | |
| 11,417,200 | B2 | 8/2022 | Hass et al. | |
| 11,441,332 | B2 | 9/2022 | Johnson et al. | |
| 11,460,874 | B1 * | 10/2022 | King | G05F 1/625 |
| 11,532,192 | B2 | 12/2022 | Hass et al. | |
| 11,536,078 | B2 | 12/2022 | Dreyer | |
| 11,539,794 | B1 | 12/2022 | Weber et al. | |
| 11,543,801 | B2 | 1/2023 | Hall et al. | |
| 11,585,143 | B1 * | 2/2023 | Iriarte | E05B 47/0001 |
| 11,655,669 | B2 | 5/2023 | Hutton et al. | |
| 11,694,287 | B2 | 7/2023 | Marcinkowski et al. | |
| 11,729,014 | B2 | 8/2023 | Marcinkowski et al. | |
| 11,767,710 | B1 | 9/2023 | Johnston | |
| 12,141,130 | B2 | 11/2024 | Gong et al. | |
| 2009/0308116 | A1 | 12/2009 | Lambrou | |
| 2011/0296761 | A1 * | 12/2011 | Wood | E05D 11/0081 248/65 |
| 2012/0073083 | A1 | 3/2012 | Staude | |
| 2014/0001880 | A1 | 1/2014 | Herglotz et al. | |
| 2014/0020295 | A1 | 1/2014 | Bonahoom et al. | |
| 2014/0213073 | A1 | 7/2014 | Harvey | |
| 2014/0267739 | A1 | 9/2014 | Ibsies | |
| 2015/0136437 | A1 * | 5/2015 | Hitchman | E04F 21/0076 174/54 |
| 2016/0040469 | A1 * | 2/2016 | Lietz | E05F 15/70 49/31 |
| 2016/0163139 | A1 | 6/2016 | Kankkunen et al. | |
| 2016/0322847 | A1 | 11/2016 | Geiszler | |
| 2017/0040827 | A1 | 2/2017 | Weber | |
| 2017/0306674 | A1 | 10/2017 | Soloski et al. | |
| 2017/0358952 | A1 | 12/2017 | Butler et al. | |
| 2019/0020183 | A1 * | 1/2019 | Hitchman | H05K 5/0247 |
| 2019/0211585 | A1 | 7/2019 | Lowder | |
| 2019/0271186 | A1 | 9/2019 | Chen et al. | |
| 2019/0333302 | A1 | 10/2019 | Kagnew et al. | |
| 2020/0014552 | A1 | 1/2020 | Tan et al. | |
| 2020/0082240 | A1 | 3/2020 | Heitmar | |
| 2020/0227903 | A1 * | 7/2020 | Helnerus | H02G 3/16 |
| 2020/0349786 | A1 | 11/2020 | Ho et al. | |
| 2020/0378172 | A1 | 12/2020 | Lerpard | |
| 2021/0207419 | A1 * | 7/2021 | Sorice | E05F 15/611 |
| 2021/0207420 | A1 * | 7/2021 | Sorice | E06B 3/70 |
| 2021/0207421 | A1 * | 7/2021 | Sorice | H02J 5/00 |
| 2021/0209878 | A1 | 7/2021 | Kim et al. | |

(56) References Cited

U.S. PATENT DOCUMENTS

| | | | | |
|---|---|---|---|---|
| 2021/0359433 | A1* | 11/2021 | Aguilar | H01R 9/2408 |
| 2022/0155005 | A1 | 5/2022 | Lee et al. | |
| 2022/0186543 | A1 | 6/2022 | Soderqvist | |
| 2022/0263297 | A1* | 8/2022 | Bodurka | H02G 3/04 |
| 2022/0351722 | A1 | 11/2022 | Mandry et al. | |
| 2022/0392287 | A1 | 12/2022 | Shen | |
| 2023/0062621 | A1 | 3/2023 | Cheung | |
| 2023/0184022 | A1 | 6/2023 | Eliasson et al. | |
| 2024/0146046 | A1 | 5/2024 | Gong et al. | |
| 2025/0140046 | A1* | 5/2025 | Fink | H04W 4/80 |

FOREIGN PATENT DOCUMENTS

| | | | | | |
|---|---|---|---|---|---|
| CN | 103606213 | A | | 2/2014 | |
| CN | 104105248 | A | | 10/2014 | |
| CN | 203925102 | U | | 11/2014 | |
| CN | 205117039 | U | | 3/2016 | |
| CN | 106761274 | A | | 5/2017 | |
| CN | 106836990 | A | | 6/2017 | |
| CN | 206309153 | U | | 7/2017 | |
| CN | 206329255 | U | | 7/2017 | |
| CN | 107191110 | A | | 9/2017 | |
| CN | 107448128 | A | | 12/2017 | |
| CN | 107575137 | A | | 1/2018 | |
| CN | 107610390 | A | | 1/2018 | |
| CN | 107643706 | A | | 1/2018 | |
| CN | 206903524 | U | | 1/2018 | |
| CN | 107705511 | A | | 2/2018 | |
| CN | 107730687 | A | | 2/2018 | |
| CN | 107747457 | A | | 3/2018 | |
| CN | 107795255 | A | | 3/2018 | |
| CN | 107829659 | A | | 3/2018 | |
| CN | 108118987 | A | | 6/2018 | |
| CN | 207458156 | U | | 6/2018 | |
| CN | 108389290 | A | | 8/2018 | |
| CN | 108399674 | A | | 8/2018 | |
| CN | 108412359 | A | | 8/2018 | |
| CN | 108442852 | A | | 8/2018 | |
| CN | 206865208 | U | | 8/2018 | |
| CN | 108661486 | A | | 10/2018 | |
| CN | 108756617 | A | | 11/2018 | |
| CN | 108868508 | A | | 11/2018 | |
| CN | 108915498 | A | | 11/2018 | |
| CN | 108924015 | A | | 11/2018 | |
| CN | 108952449 | A | | 12/2018 | |
| CN | 109098543 | A | | 12/2018 | |
| CN | 109138774 | A | | 1/2019 | |
| CN | 109191617 | A | | 1/2019 | |
| CN | 109191739 | A | | 1/2019 | |
| CN | 109236134 | A | | 1/2019 | |
| CN | 109236135 | A | | 1/2019 | |
| CN | 109267837 | A | | 1/2019 | |
| CN | 109472902 | A | | 3/2019 | |
| CN | 208777869 | U | | 4/2019 | |
| CN | 110009782 | A | | 7/2019 | |
| CN | 110264682 | A | | 9/2019 | |
| CN | 209429913 | U | | 9/2019 | |
| CN | 110409954 | A | | 11/2019 | |
| CN | 110505182 | A | | 11/2019 | |
| CN | 110531631 | A | | 12/2019 | |
| CN | 209990389 | U | | 1/2020 | |
| CN | 110778265 | A | | 2/2020 | |
| CN | 111173404 | A | | 5/2020 | |
| CN | 111270959 | A | | 6/2020 | |
| CN | 111343432 | A | | 6/2020 | |
| CN | 111441680 | A | | 7/2020 | |
| CN | 211038390 | U | | 7/2020 | |
| CN | 211124167 | U | | 7/2020 | |
| CN | 111505947 | A | | 8/2020 | |
| CN | 111540093 | A | | 8/2020 | |
| CN | 111653025 | A | | 9/2020 | |
| CN | 111764747 | A | | 10/2020 | |
| CN | 211851423 | U | | 11/2020 | |
| CN | 112096221 | A | | 12/2020 | |
| CN | 112211496 | A | | 1/2021 | |
| CN | 112267796 | A | | 1/2021 | |
| CN | 112330869 | A | | 2/2021 | |
| CN | 112491668 | A | | 3/2021 | |
| CN | 112539020 | A | | 3/2021 | |
| CN | 213205374 | U | | 5/2021 | |
| CN | 112901047 | A | | 6/2021 | |
| CN | 113048374 | A | | 6/2021 | |
| CN | 113129476 | A | | 7/2021 | |
| CN | 113338772 | A | | 9/2021 | |
| CN | 113345130 | A | | 9/2021 | |
| CN | 113545639 | A | | 10/2021 | |
| CN | 113645446 | A | | 11/2021 | |
| CN | 113674454 | A | | 11/2021 | |
| CN | 113706744 | A | | 11/2021 | |
| CN | 214835862 | U | | 11/2021 | |
| CN | 214886488 | U | | 11/2021 | |
| CN | 214943492 | U | | 11/2021 | |
| CN | 215169563 | U | | 12/2021 | |
| CN | 113947834 | A | | 1/2022 | |
| CN | 217240775 | U | | 8/2022 | |
| CN | 217307315 | U | | 8/2022 | |
| CN | 115095246 | A | | 9/2022 | |
| CN | 115164381 | A | | 10/2022 | |
| CN | 115235096 | A | | 10/2022 | |
| CN | 115294675 | A | | 11/2022 | |
| CN | 115324428 | A | | 11/2022 | |
| CN | 115341821 | A | | 11/2022 | |
| CN | 115393988 | A | | 11/2022 | |
| CN | 218454661 | U | | 2/2023 | |
| CN | 115798084 | A | | 3/2023 | |
| CN | 116251221 | A | | 6/2023 | |
| CN | 219197192 | U | | 6/2023 | |
| CN | 219246122 | U | | 6/2023 | |
| CN | 116498183 | A | | 7/2023 | |
| CN | 116760602 | A | | 9/2023 | |
| CN | 117238059 | A | | 12/2023 | |
| DE | 9314870 | U1 | * | 10/1993 | |
| DE | 202022101334 | U1 | | 5/2022 | |
| EP | 1590546 | A1 | | 11/2005 | |
| EP | 1590546 | B1 | | 3/2008 | |
| EP | 3118405 | A1 | | 1/2017 | |
| EP | 3537398 | A1 | | 9/2019 | |
| EP | 3734000 | A1 | * | 11/2020 | E05B 47/00 |
| EP | 3845729 | A1 | | 7/2021 | |
| FR | 3132160 | A3 | | 7/2023 | |
| GB | 2165034 | A | * | 4/1986 | A47F 3/043 |
| IN | 201921017138 | A | | 5/2019 | |
| IN | 201911049967 | A | | 12/2019 | |
| IN | 201911048995 | A | | 5/2021 | |
| IN | 202111053824 | A | | 12/2021 | |
| IN | 202241020116 | A | | 4/2022 | |
| IN | 202241026843 | A | | 5/2022 | |
| IN | 411059 | B | | 11/2022 | |
| IN | 202111013824 | A | | 12/2022 | |
| IN | 430120 | B | | 4/2023 | |
| IN | 202341019331 | A | | 4/2023 | |
| JP | 2013217129 | A | | 10/2013 | |
| JP | 6680821 | B2 | | 3/2020 | |
| JP | 2020042440 | A | | 3/2020 | |
| JP | 6777955 | B2 | | 10/2020 | |
| KR | 20160025226 | A | | 3/2016 | |
| KR | 20160050965 | A | | 5/2016 | |
| KR | 20160123639 | A | | 10/2016 | |
| KR | 20160124481 | A | | 10/2016 | |
| KR | 101800514 | B1 | | 12/2017 | |
| KR | 20180076537 | A | | 7/2018 | |
| KR | 20180131716 | A | | 12/2018 | |
| KR | 101988851 | B1 | | 6/2019 | |
| KR | 20190098719 | A | | 8/2019 | |
| KR | 20190098720 | A | | 8/2019 | |
| KR | 102024754 | B1 | | 9/2019 | |
| KR | 102079532 | B1 | | 2/2020 | |
| KR | 102150642 | B1 | | 9/2020 | |
| KR | 20200143302 | A | | 12/2020 | |
| KR | 20210004253 | A | | 1/2021 | |
| KR | 20210016726 | A | | 2/2021 | |
| KR | 20210019211 | A | | 2/2021 | |
| KR | 20210019216 | A | | 2/2021 | |
| KR | 20210019218 | A | | 2/2021 | |

(56) References Cited

FOREIGN PATENT DOCUMENTS

| | | | |
|---|---|---|---|
| KR | 20210019241 | A | 2/2021 |
| KR | 20210045195 | A | 4/2021 |
| KR | 20210072510 | A | 6/2021 |
| KR | 20210078199 | A | 6/2021 |
| KR | 102303254 | B1 | 9/2021 |
| KR | 102329035 | B1 | 11/2021 |
| KR | 102341883 | B1 | 12/2021 |
| KR | 20210153308 | A | 12/2021 |
| KR | 20220031428 | A | 3/2022 |
| KR | 102421708 | B1 | 7/2022 |
| KR | 20220113136 | A | 8/2022 |
| KR | 20220119878 | A | 8/2022 |
| KR | 102472384 | B1 | 12/2022 |
| KR | 102534826 | B1 | 5/2023 |
| TW | M627626 | U | 6/2022 |
| WO | 2013163124 | A1 | 10/2013 |
| WO | 2016032464 | A1 | 3/2016 |
| WO | 2016175910 | A1 | 11/2016 |
| WO | 2017024088 | A1 | 2/2017 |
| WO | 2018184450 | A1 | 10/2018 |
| WO | 2018184452 | A1 | 10/2018 |
| WO | 2018184453 | A1 | 10/2018 |
| WO | 2018184454 | A1 | 10/2018 |
| WO | 2019068021 | A1 | 4/2019 |
| WO | 2019162435 | A1 | 8/2019 |
| WO | 2022004989 | A1 | 1/2022 |
| WO | 2022010071 | A1 | 1/2022 |
| WO | 2022010072 | A1 | 1/2022 |
| WO | 2022010073 | A1 | 1/2022 |
| WO | 2022010074 | A1 | 1/2022 |
| WO | 2022020893 | A1 | 2/2022 |
| WO | 2022145966 | A1 | 7/2022 |
| WO | 2022263147 | A1 | 12/2022 |
| WO | 2023180427 | A1 | 9/2023 |

OTHER PUBLICATIONS

Chilean Office Action for Application No. 202201823 dated Sep. 29, 2023, 15 pp.

Chilean Search Report issued for Chilean Application No. 2022-01823; Report Mail Date Oct. 6, 2024 (32 Pages with Translation).

Chilean Office Action for Chilean Application No. 2022-01823; Report Mail Date Jan. 6, 2025 (6 Pages with Translation).

First Examination Report issued in IN 202217040972, mailed Mar. 11, 2025 [4 Pages].

* cited by examiner

DOOR SYSTEM WITH INTEGRATED ELECTRIC DEVICES

CROSS-REFERENCE TO RELATED APPLICATION AND CLAIM TO PRIORITY

This Application claims the benefit of U.S. Provisional Patent Applications Ser. No. 62/957,418 filed Jan. 6, 2020, Ser. No. 63/064,056 filed Aug. 11, 2020 and Ser. No. 63/087,528 filed Oct. 5, 2020, all by Sorice et al., which are hereby incorporated herein by reference in its entirety and to which priority is claimed.

BACKGROUND OF THE INVENTION

1. Field of the Invention

The present invention is directed to exterior and interior doors for residential or commercial buildings, such as for a home, apartment, condominium, hotel room or business, and more particularly to a door system comprising a prewired door provided with integrated electric devices plugged into or otherwise electrically connected to prewired receptacles, and sources of low- and/or high-voltage electrical power in order to provide power that may be used to operate the integrated electric devices.

2. Description of the Related Art

Typical existing exterior and interior doors for residential or commercial buildings may have a number of electric devices (or components) mounted to the doors in order to provide desired functions, such as electronic access control, door state feedback, an entry camera and audio communication, an electric powered door latch, an electric powered door lock, etc. Also, the market for exterior and interior doors has seen an increasing adoption of additional electric devices, including video doorbells, smart locks, LED lighting, smart glass, electromechanical door closers, wireless connectivity electronics, etc. Each of these discrete electric devices is an add-on to an existing door, functions with the existing door construction, and is powered separately with at least one battery that needs periodic replacement. Should the battery not be replaced, then the electric device will not operate.

Current electric devices are mounted to exterior and interior doors in a manner that can be unattractive and unpleasant to look at. They typically each have either one or more rechargeable battery packs or at least one non-rechargeable battery that must periodically be changed and have some type of weatherable housing.

While the commercial market, e.g. multi-tenant and mixed-use housing, hospitality, office, etc., has developed electrified door entry systems with electric strikes and door controller technologies, adoption of such devices into the residential market has been limited. Existing residential door construction techniques focus on stile and rail construction, and have not seen integration of power systems, power management systems or integration of electric devices.

Therefore, the need exists for a door designed for integration of electric devices into the door through plugs and other connection devices, with power run to the door so electric devices can function with the power managed by a control system so that the devices may be easily integrated into and powered from a central power supply without adversely impacting structural integrity, insulation and/or acoustic performance, energy efficiency, and aesthetics of the door. Thus, improvements that may enhance performance and cost of door systems with electric devices are possible.

BRIEF SUMMARY OF THE INVENTION

According to a first aspect of the present invention, there is provided a door system. The door system comprises a door frame adapted to be mounted within an opening, a door pivotally attached to the door frame, a power converter such as an AC/DC converter configured to be electrically connected to an AC power unit operably associated with the door system, a slot in the door, a pre-wired receptacle disposed in the slot, and a DC electric device removably disposed in the pre-wired receptacle and electrically connected to the AC/DC converter through the electrical connector of the pre-wired receptacle. The pre-wired receptacle comprises an electrical connector electrically connected the AC/DC converter.

According to a second aspect of the present invention, there is provided an entryway. The entryway comprises a door frame within an opening, a door pivotally attached to the door frame, an AC power supply operably associated with the door frame, a power converter such as an AC/DC converter operably associated with the door frame and electrically connected to the AC power supply, a DC power distribution system mounted to the door or door frame and electrically connected to the AC/DC converter, a plurality of DC electric devices mounted to the door or door frame and electrically connected to the DC power distribution system, a slot in the door, and a pre-wired receptacle disposed in the slot, the pre-wired receptacle comprising an electrical connector electrically connected to the DC power distribution system. At least one of the DC electric devices is removably mounted in the pre-wired receptacle and electrically connected to the AC/DC converter through the electrical connector of the pre-wired receptacle.

Other aspects of the invention, including apparatus, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS

Figure 1:
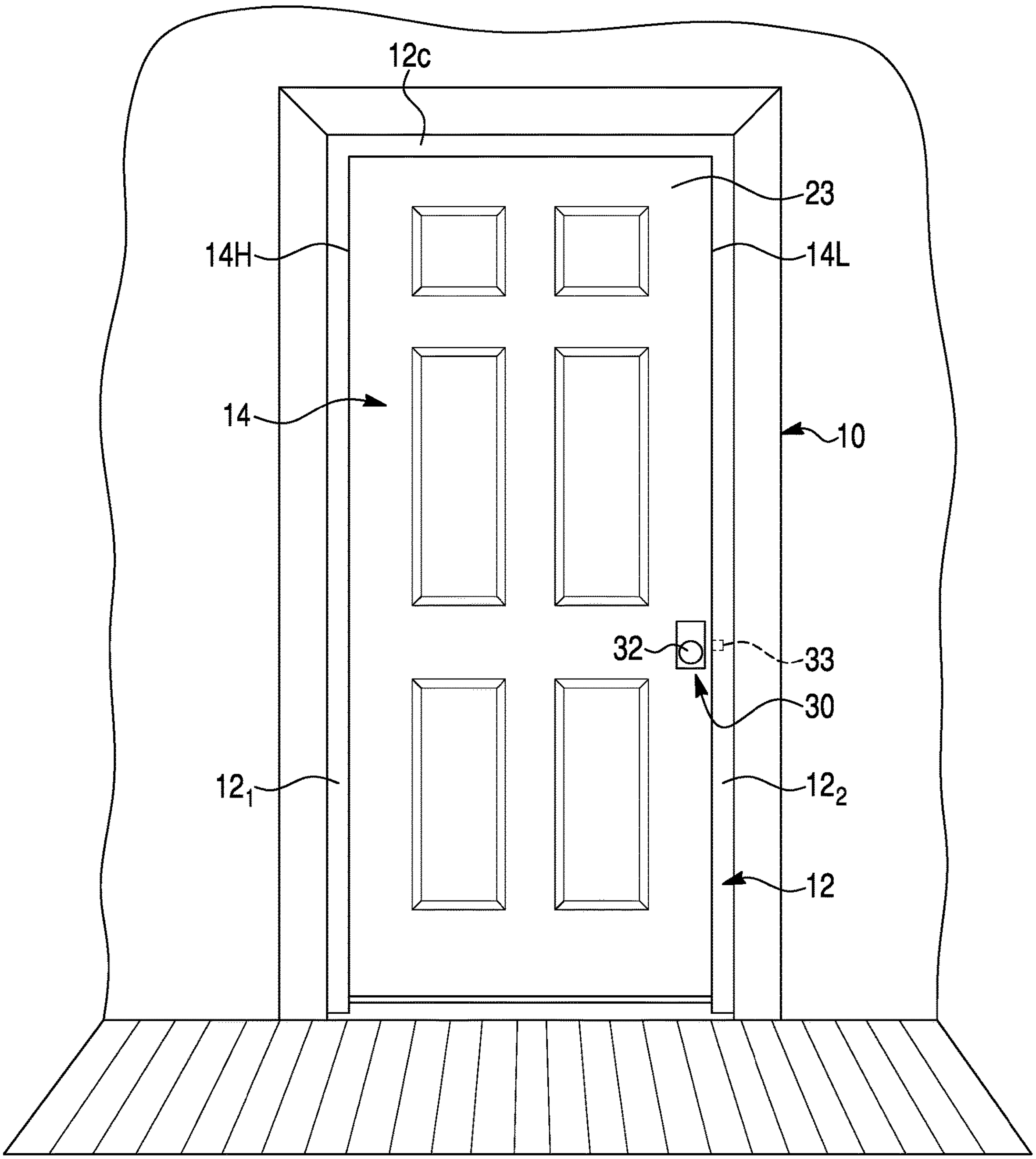
FIG. 1 is an elevational exterior view of an exterior door system according to a first exemplary embodiment of the present invention.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as “horizontal,” “vertical,” “front,” “rear,” “upper”, “lower”, “top” and “bottom” as well as derivatives thereof (e.g., “horizontally,” “vertically,” “downwardly,” “upwardly,” etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as “connected” and “interconnected,” refer to a relationship wherein structures are secured or attached to one another either directly or indirectly through intervening structures, as well as both movable or rigid attachments or relationships, unless expressly described otherwise. The term “operatively connected” is such an attachment, coupling or connection that allows the pertinent structures to operate as intended by virtue of that relationship. The term “integral” (or “unitary”) relates to a part made as a single part, or a part made of separate components fixedly (i.e., non-moveably) connected together. Additionally, the word “a” and “an” as used in the claims means “at least one” and the word “two” as used in the claims means “at least two”.

Figure 2:
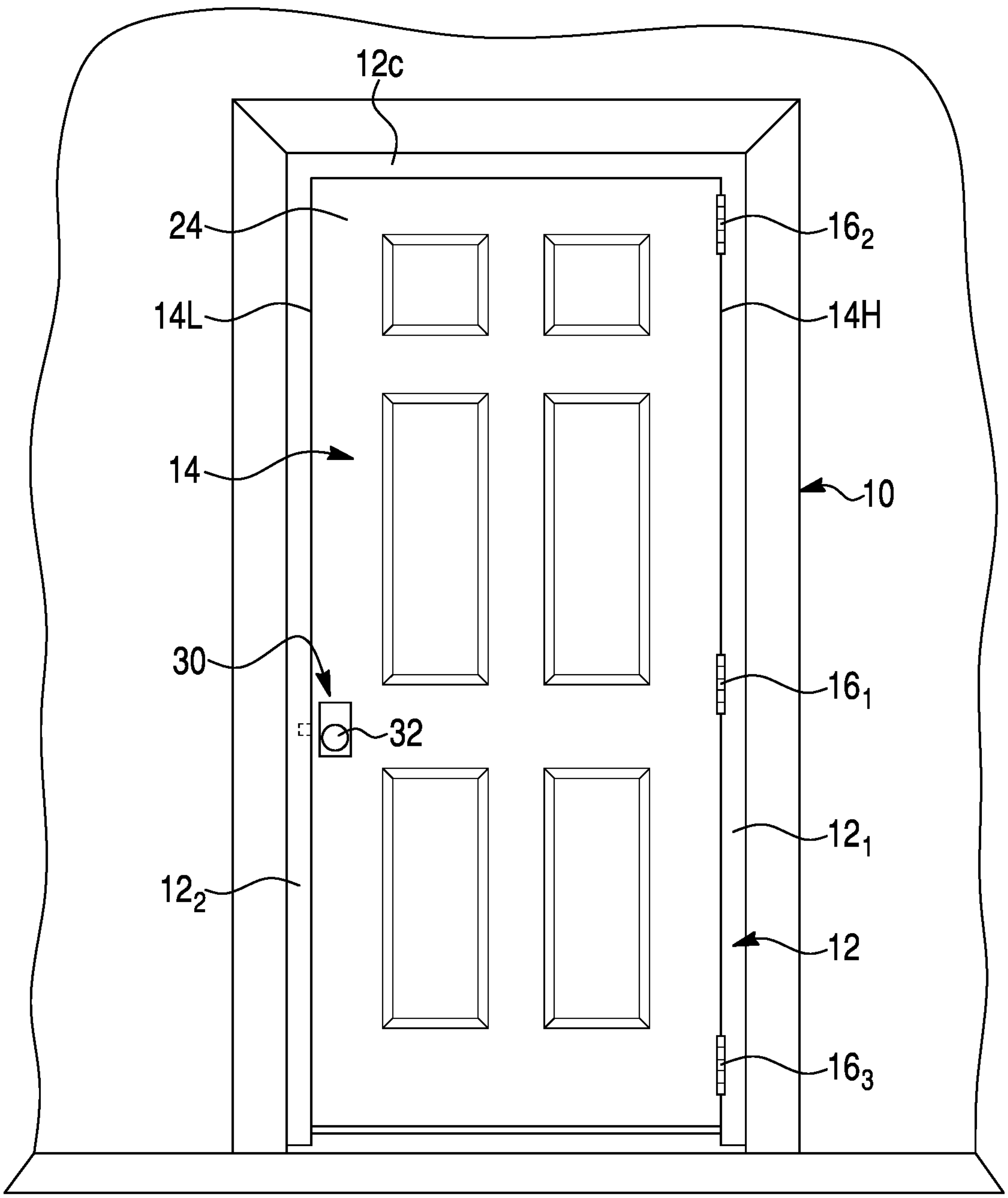
FIG. 2 is an elevational view of the interior side of the door system according to the first exemplary embodiment of the present invention.

FIGS. 1 and 2 illustrate a door system 10 according to a first exemplary embodiment of the present invention, such as a pre-hung door. The door system 10 includes a conventional hinged residential exterior door assembly 11, but it should be understood that the door assembly 11 may be a pivotally mounted exterior or interior door assembly provided for a residential or commercial building, such as a home, apartment, garage, condominium, hotel, office building, or the like. The door assembly 11 may be made of any appropriate material, such as wood, metal, wood composite material, fiberglass reinforced polymer composite or the like. The door assembly 11 includes a substantially rectangular door frame 12 and a door 14 pivotally attached thereto by at least one hinge $\mathbf{16}_1$, such as a “butt hinge” that includes two leaves.

The door frame 12 includes first and second parallel, spaced apart vertically extending jamb members $\mathbf{12}_1$, $\mathbf{12}_2$ and a horizontally extending upper jamb rail member or header 12*c* that connects upper ends of the first and second jamb members $\mathbf{12}_1$, $\mathbf{12}_2$. Those skilled in the art recognize that lower ends of the jamb members $\mathbf{12}_1$, $\mathbf{12}_2$ may be interconnected through a threshold $\mathbf{12}_t$. The at least one hinge $\mathbf{16}_1$ pivotally attaches the door 14 to the first jamb member $\mathbf{12}_1$. Typically, at least two hinges $\mathbf{16}_1$ and $\mathbf{16}_2$ are provided to secure the door 14 to the first jamb member $\mathbf{12}_1$. Preferably, as best shown in FIG. 2, three hinges $\mathbf{16}_1$, $\mathbf{16}_2$, $\mathbf{16}_3$ are used to secure the door 14 to the door frame 12. In the interest of simplicity, the following discussion will sometimes use a reference numeral 16 without a subscript numeral to designate an entire group of the hinges. For example, the reference numeral 16 will be sometimes used when generically referring to the hinges $\mathbf{16}_1$, $\mathbf{16}_2$ and $\mathbf{16}_3$.

Figure 3:
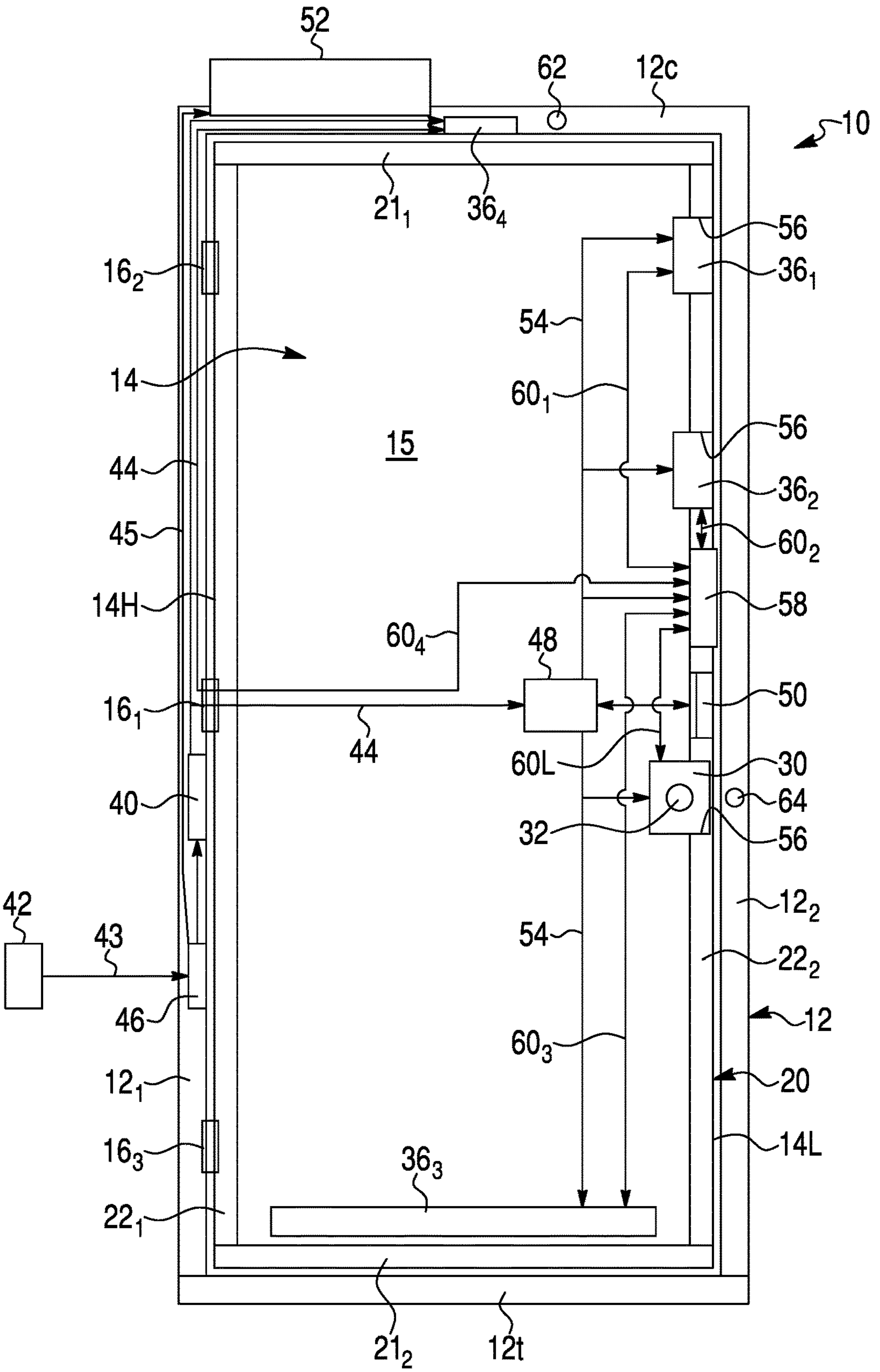
FIG. 3 is an elevational view of the door system according to the first exemplary embodiment of the present invention without an exterior door skin in order to allow observation of the interior of a door.

The door 14 includes a rectangular inner door frame 20, an exterior door skin (or facing) 23, and an interior door skin (or facing) 24 secured to opposite sides of the inner door frame 20, as best shown in FIGS. 1-3. The exterior and interior door skins 23 and 24 are formed separately from one another, and typically are identical in appearance. The door skins 23 and 24 are secured, e.g., typically adhesively, to a suitable core and/or to opposite sides of the inner door frame 20 so that the inner door frame 20 is sandwiched between the exterior and interior door skins 23 and 24. Typically, the exterior and interior door skins 23 and 24 are made of a polymer-based composite, such as sheet molding compound (“SMC”) or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

The inner door frame 20 includes a pair of parallel, spaced apart horizontally extending top and bottom rails $\mathbf{21}_1$ and $\mathbf{21}_2$, respectively, and a pair of parallel, spaced apart vertically extending first and second stiles $\mathbf{22}_1$ and $\mathbf{22}_2$, respectively, typically manufactured from wood or an engineered wood, such as a laminated veneer lumber (LVL). The top and bottom rails $\mathbf{21}_1$ and $\mathbf{21}_2$ horizontally extend between the first and second stiles $\mathbf{22}_1$and $\mathbf{22}_2$. Moreover, the top and bottom rails $\mathbf{21}_1$ and $\mathbf{21}_2$ may be fixedly secured to the first and second stiles $\mathbf{22}_1$ and $\mathbf{22}_2$, such as through adhesive or mechanical fasteners. The inner door frame 20 further may include a mid-rail. The mid-rail extends horizontally and is spaced apart from the top and bottom rails $\mathbf{21}_1$ and $\mathbf{21}_2$, respectively, and is typically also manufactured from wood or an engineered wood, such as a laminated veneer lumber (LVL). Moreover, the mid-rail may be fixedly secured to the first and second stiles $\mathbf{22}_1$ and $\mathbf{22}_2$. The hinges 16 are secured to the first stile $\mathbf{22}_1$, which defines a hinge stile of the inner door frame 20.

The inner door frame 20 and the exterior and interior door skins 23, 24 of a typical door 14 surround an interior cavity, which may be hollow or may be filled with, for example, corrugated pads, foam insulation, or other core materials, if desired. Thus, the door 14 may include a core 15 disposed within the inner door frame 20 between the exterior and interior door skins 23 and 24. The core 15 may be formed from foam insulation, such as polyurethane foam material, cellulosic material and binder resin, corrugated pads, etc.

The door system 10, according to the first exemplary embodiment, includes a number of DC (i.e., direct current) electric components (devices) mounted to the door 14 of the door system 10 to provide functions, such as electronic access control, door state feedback, entry camera and audio/video communication, etc. Specifically, the electric devices that may be mounted to the door 14 of the door system 10 include, but are not limited to, an electric powered door latch 30, a video doorbell $36_1$, a digital camera $36_2$, a threshold LED light $36_3$ and a hallway illumination light $36_4$ with a motion detector (or motion sensor) or a proximity sensor 62 mounted to the frame assembly 12, as best illustrated in FIG. 3. Specifically, the electric powered door latch 30 is mounted to the inner door frame 20 of the door 14, while the video doorbell $36_1$, the digital camera $36_2$ and the threshold LED light $36_3$ may be mounted to the door frame 12 or to the door 14 of the door system 10, as best illustrated in FIG. 3. Alternatively, the video doorbell $36_1$, the digital camera $36_2$, the threshold LED light $36_3$ or the hallway illumination light $36_4$ may be mounted to the door frame 12 or even adjacent to the frame 12 on a wall of the building. The threshold LED light $36_3$ and/or the hallway illumination light $36_4$ may illuminate when an authorized person is recognized or otherwise identified, or when a person approaches the door 14.

The DC electric devices $36_1$-$36_4$ typically are low-voltage DC electric devices operated by low-voltage DC electrical power. Low voltage direct current (DC) is known in the art as 50 volts (V) or less. Common low voltages are 5 V, 12 V, 24 V, and 48 V. Low voltage is normally used for doorbells, video doorbells, garage door opener controls, heating and cooling thermostats, alarm system sensors and controls, outdoor ground lighting, household and automobile batteries. Many DC electric devices operate at 5 V DC. Low voltage (when the source is operating properly), such as 5 V DC, will not provide a shock from contact. However, a high current, low voltage short circuit (automobile battery) can cause an arc flash and possible burns.

It should be understood that the door system 10 according to the present invention may include other electric devices, as there are a number of electric devices marketed to be mounted to doors and provide functions such as electronic access control, door state feedback, entry camera and communication, etc. In the interest of simplicity, the following discussion will sometimes use a reference numeral without a subscript numeral to designate an entire group of the electric devices. For example, the reference numeral 36 will be sometimes used when generically referring to the electric devices $36_1$-$36_4$.

During installation of the digital camera $36_2$, the exterior door facing 23 is drilled at a predetermined place to create an opening in the door facing 23 and the core 15 in which the camera $36_2$ may be positioned, for exposing the lens of the digital camera $36_2$ and having the camera $36_2$ observe a field in front of the door system 10. The digital camera $36_2$ may be fixed to the exterior door facing 23 by a bezel (not shown) when the digital camera $36_2$ is received in the door 14. The camera $36_2$ additionally may be mechanically secured within the opening in the door 14, such as through a barbed clip or the like extending from the camera $36_2$ and engaging the interior surface of the door facing 23. Moreover, an exterior bezel around camera $36_2$ prevents humidity, moisture, water or rain penetration inside the door 14. Additionally, the bezel makes unintended removal or disablement of camera $36_2$ more difficult by preventing access to the interior of the door 14.

As best illustrated in FIGS. 1 and 2, the electric powered door latch 30 includes a powered central latch bolt 33 moveable between extended and retracted positions. As best illustrated in FIGS. 1-3, the electric powered door latch 30 is mounted to the latch side 14L of the door 14. Specifically, the electric powered door latch 30 is mounted to the second stile $22_2$, which defines a latch stile of the door frame 20. The electric powered door latch 30 may have a lighted door knob 32 and a lighted keyhole, which illuminate when a user approaches. The handle 32 is manually operable by a user to retract the central latch bolt 33 to allow opening of the door 14 from a closed position to an open position.

Moreover, the door system 10 further comprises an electric door operator (powered door closer) 52 associated with the frame assembly 12 and connected to the door 14, as best shown in FIG. 3. According to the first exemplary embodiment, the powered door closer 52 is mounted to the frame assembly 12. The electric powered door latch 30 is operated at low-voltage DC electrical power, while the electric door operator 52 is operated at high-voltage AC electrical power of 115 volts. The door closer 52 preferably has a base secured to frame 12. An AC motor is secured to the base and an articulating arm has one end connected to the motor and the other end engaged with door 14, so that operation of the arm causes the door 14 to be closed. Alternatively, the electric door operator 52 may also operate at low-voltage DC electrical power.

As illustrated in FIG. 3, the door system 10 further includes an AC distribution unit 46 and a power converter, such as a low-voltage (such as 5 volts (V), 12 volts, 24 volts or other required voltage) AC to DC (AC/DC) converter 40, both mounted to the door frame 12. As best illustrated in FIG. 3, the low voltage AC/DC converter 40 is located in a pocket machined or otherwise formed into the first jamb member $12_1$ of the door frame 12, which is adjacent to the hinges 16 and the first stile of the door frame 20, i.e., adjacent to the hinge side 14H of the door 14. While we illustrate the AC/DC converter 40 mounted to the jamb $12_1$, it may be mounted elsewhere on frame 12. The low voltage AC/DC converter 40 is electrically connected by high voltage wires 43 to a 120 (or 110) V AC power unit 42 installed during home construction or located adjacent the door assembly 11. The low voltage AC/DC converter 40 can be located at a standardized height on the first jamb member $12_1$ of the door frame 12 so that the AC power unit 42 may be installed during home construction. Due to their close proximity, the AC/DC converter 40 and AC power unit 42 may be easily electrically connected. Alternatively, the low voltage AC/DC converter 40 may be disposed outside the door assembly 11, such as at the wall adjacent the door frame 12. The AC power unit 42 defines a source of high voltage (i.e., 120 (or 110) volts of a standard general-purpose alternating-current (AC) electrical power supply or a high voltage electrical power supply) disposed outside but adjacent the door system 10. Typically, the standard 120 (or 110) volts general-purpose AC electrical power supply is known in the USA as grid power, wall power, or domestic power. Other voltages, such as 220 volts, may be used. The low voltage AC/DC converter 40 after connection to AC power unit 42 converts the standard general-purpose alternating-current (AC) high voltage of 120 V to the low voltage of 5 volts DC, 12 volts DC, 24 volts DC, or other required voltage. Many electric devices operate at 5 volts DC or 12 volts DC, so the AC/DC converter 40 steps down the power and current type to allow typical 120 (or 115) volts general-purpose AC electrical power to be available for use at the door system 10.

The AC distribution unit 46 preferably is located in a pocket (or slot) 47 machined or otherwise formed into the first jamb member $12_1$ of the door frame 12, which is adjacent to the hinges 16 and the first stile of the door frame 20, i.e., adjacent to the hinge side 14H of the door panel 14. Alternatively, the AC distribution unit 46 may be located in a pocket (or slot) machined or otherwise formed into the upper jamb rail member header 12*c* of the frame assembly 12. Alternatively, the AC distribution unit 46 may be disposed outside the door assembly 11, such as at the wall adjacent the frame 12. The AC distribution unit 46 is electrically connected to the 120 (or 115) V AC power unit 42 installed during home construction and located adjacent the door system 10. The AC distribution unit 46 also is electrically coupled to the low voltage AC to DC (AC/DC) converter 40. In this way, the 120 V AC power is distributed by the AC distribution unit 46 to the low voltage AC/DC converter 40 mounted in the door frame 12, and to at least one other electric device mounted into or on the frame assembly 12, such as the electric door operator 52, through a high-voltage supply wire 45, shown in FIG. 3.

The AC/DC converter 40 is electrically connected to the door 14 through an electric power transfer device. A low voltage supply electrical wire(s) 44 runs from the low voltage AC/DC converter 40 to the electric power transfer device, such as one of the hinges $\mathbf{16}_1$, $\mathbf{16}_2$, $\mathbf{16}_3$. Specifically, the low voltage supply electrical wire(s) 44 runs to and through the hinge $\mathbf{16}_1$ disposed usually in the middle of the first jamb member $\mathbf{12}_1$ of the door frame 12 and provides an electric powered (or electric transfer) hinge that conducts the low voltage electrical power therethrough. The low voltage supply electrical wire(s) 44 transfers electrical power across or through the electric powered hinge $\mathbf{16}_1$. Exemplary electrical hinges are disclosed in U.S. Pat. Nos. 3,860,312, 3,857,625, 3,842,386, 3,838,234, 3,355,695, 1,744,040, 615,209, 612,192 and US published patent application No. 2017/0306674, 2014/0213073, 2014/0001880, 2012/0073083, the complete disclosures of which are incorporated herein by reference.

Alternatively, an electric power transfer device, such as provided by an armored electrical cable, may be used instead of the hinges $\mathbf{16}_1$, $\mathbf{16}_2$, $\mathbf{16}_3$ to transfer low voltage electrical power from the door frame 12 to the pivotable door 14. The low voltage supply electrical wire(s) 44 may pass from the low voltage AC/DC converter 40 in the first jamb member $\mathbf{12}_1$ of the door frame 12 to the pivotable door 14 without using the electric powered hinge, i.e., bypassing any of the door hinges $\mathbf{16}_1$, $\mathbf{16}_2$, $\mathbf{16}_3$. Exemplary electric power transfer devices are disclosed in U.S. Pat. Nos. 3,848,361, 4,445,299, 6,350,956, 6,812,407, 8,448,382, 8,505,169 and 9,825,443, the complete disclosures of which are incorporated herein by reference. Low voltage DC power is supplied to door 14 in order to minimize the possibility of electrical shock to a user. Further, the electric devices 36 typically are battery operated and thus operate on DC current at relatively low voltages, typically 5 V DC.

The supply electrical wire(s) 44 is connected to the powered hinge $\mathbf{16}_1$ on the hinge side 14H of the door 14 and preferably runs through a horizontal supply channel 27 to a DC power distribution system, such as provided by an electrical distribution block 48, located in or adjacent to the vertical supply passage 25 on the latch side 14L of the door 14. The DC power distribution system 48 transmits low voltage DC power, data, electric signals, or a combination thereof. According to the first exemplary embodiment, the DC power distribution system 48 is disposed in a pocket (or slot) machined or otherwise formed in the inner door frame 20. Electric power can be delivered from the DC power distribution system 48 to the electric devices $\mathbf{36}_1$ and $\mathbf{36}_2$ that are mounted to the door 14, specifically into the latch stile $\mathbf{22}_2$.

In the event the electric devices 36 have connectors for connection to the DC power distribution system 48, the connectors may have a flange or some other unique mechanical identifier to mate with a complementary receptacle in order to identify or designate the connector and thus its electric device 36 as approved for use with the door system 11. Alternatively, the electric devices 36 may have an electronic signature or some other electrical identifier to assure that the electric device 36 is approved for installation. A software handshake is another verification mechanism that may be utilized for electric devices 36.

Low-voltage DC electrical power is delivered from the power distribution system 48 to the electric powered door latch 30 and the electric devices $\mathbf{36}_1$-$\mathbf{36}_3$, and other low power DC electric devices, that are mounted to the door 14. Moreover, the low-voltage DC electrical power is delivered from the low-voltage AC/DC converter 40 directly to the low-voltage electric device $\mathbf{36}_4$ that is mounted to the frame assembly 12 by the low-voltage supply wire 44 so as to bypass the DC power distribution system 48, as shown in FIG. 3.

A plurality of connecting electrical wires 54 electrically connect the DC power distribution system 48 to the electric powered door latch 30, and the electric powered devices $\mathbf{36}_1$ and $\mathbf{36}_2$. Alternatively, electrical connectors may be premounted in the door 14 at desired locations, so that the electric devices 36 may simply be inserted and plugged into electrical connectors. A standard flange size and plug location relative to the location of a flange of the electric devices 36 may be set, so that suppliers may supply electric devices that are easily plugged into the door 14. The supply electrical wire(s) 44 and the plurality of the connecting electrical wires 54 together define an electrical wire system, which is disposed within the door 14 and is electrically connected to the AC/DC converter 40 and to the DC electric devices 30 and 36. The electrical wire system includes the DC power distribution system and may be in the form of a wire harness electrically connected to the AC/DC converter 40 and to the DC electric devices 30 and 36, and other DC electric devices.

The door 14 allows easy integration of the electric devices 36, while maintaining structural, insulation, acoustic attenuation, and aesthetic requirements of an exterior or interior door. Moreover, slots (or openings) 56, such as of up to 1" in width, may be machined or otherwise formed, such as by molding, into the latch stile $\mathbf{22}_2$ to allow mounting of various electric devices, as best shown in FIG. 3. Specifically, the slots 56 are formed into a peripheral edge of the door 14, such as into an edge 14EL of the latch side 14L of the door 14. Alternatively, one or more of the slots 56 may be formed into the top or bottom rails $\mathbf{21}_1$ and $\mathbf{21}_2$, or into the first stile $\mathbf{22}_1$ of the inner door frame 20. Moreover, the slots 56 open on the peripheral edge of the latch stile $\mathbf{22}_2$. Alternatively, at least one of the slots 56 may be open onto the facings 23, 24 of the door 14.

The connecting wires 54 may be run to the low-voltage power distribution system 48 or connectors may be premounted in the door 14, thus allowing the electric devices 36 to be plugged-in and electrically connected so that electric power can be supplied for use and functioning of the electric devices. Providing electric power to the door system 10 and the door 14 minimizes the need for changing batteries, thus assuring more reliable operation and continuous functioning of the electrical devices.

As illustrated in FIG. 3, the door system 10 further comprises a low-voltage back-up battery (or battery pack) 50 mounted to the door 14, such as to the inner door frame 20. According to the first exemplary embodiment, the back-up battery 50 slides into a pocket formed in one of the stiles (e.g., the second stile $\mathbf{22}_2$) of the inner door frame 20. The battery 50 is electrically connected to the DC power distribution system 48. The battery 50 has a low nominal voltage (such as 5 volts (V), 24 volts or other required voltage). The nominal voltage of the battery 50 corresponds to an output voltage of the low voltage AC/DC converter 40. The door system 10 is powered and operated by the electrical power of the battery 50 as a secondary back-up electrical power source for the powered door latch 30 and the electric devices 36$_1$-36$_4$. Preferably, the battery 50 is also connected to the DC power distribution system 48 for back-up as well as to provide additional amperage for momentary, high amperage devices such as the powered door latch 30. Preferably, the battery 50 is a rechargeable battery that is charged from the DC power distribution system 48. Thus, in the door system 10, the reliance on batteries as a primary power source is less important, or if a battery option is used, a larger consolidated battery 50 may be stored in the door 14 and thus is not required in each of the electric devices.

As illustrated in FIG. 3, the door system 10 further includes an AC distribution unit 46 mounted to the frame assembly 12. The AC distribution unit 46 preferably is located in a pocket machined or otherwise formed into the first jamb member 12$_1$ of the frame assembly 12, which is adjacent to the hinges 16 and the first stile of the door frame 20, i.e., adjacent to the hinge side 14H of the door panel 14. The AC distribution unit 46 is electrically connected to a 120 (or 110) V AC power unit 42 installed during home construction. The AC distribution unit 46 also is electrically connected to a low voltage AC to DC (AC/DC) converter 40 located in a pocket machined or otherwise formed into the first jamb member 12$_1$ of the frame assembly 12, which is adjacent to the hinges 16 and the first stile of the door frame 20, i.e., adjacent to the hinge side 14H of the door panel 14. In this way, the 120 V AC power is distributed by the AC distribution unit 46 to the low voltage AC/DC converter 40 mounted in the frame assembly 12, and to at least one other electric device mounted into or on the frame assembly 12, such as the electric door operator 52, through the high-voltage supply wire 45, shown in FIG. 3.

As illustrated in FIG. 3, the door 14 of the door system 10 further comprises a central electronic control unit (ECU) (or power management controller) 58 configured to be programmed to receive an input signal from one or more sensors, such as the motion sensor (or motion detector) 62 (in wireless communication with the central ECU 58), a proximity sensor, or a smoke detector. The power management controller 58 sends commands to the electric devices 36$_1$-36$_4$, the electric powered door latch 30, and also information to the homeowner. The power management controller 58 preferably is an electronic controller having firmware and/or associated software suitable for assuring operation of the ECU and its interaction with the electric devices 36 and associated sensors, if any. Similarly, one or more sensors may be provided to not only turn-on the LED light(s) but to allow the electric powered door lock 30 to lock after determining that the individual has passed through the door 14 and the door 14 is closed, to communicate with a smartphone app to allow the owner to monitor activity around the door system 10, to determine the status of the door 14, whether open or closed, and to determine whether someone is approaching the door system 10.

Figure 4:
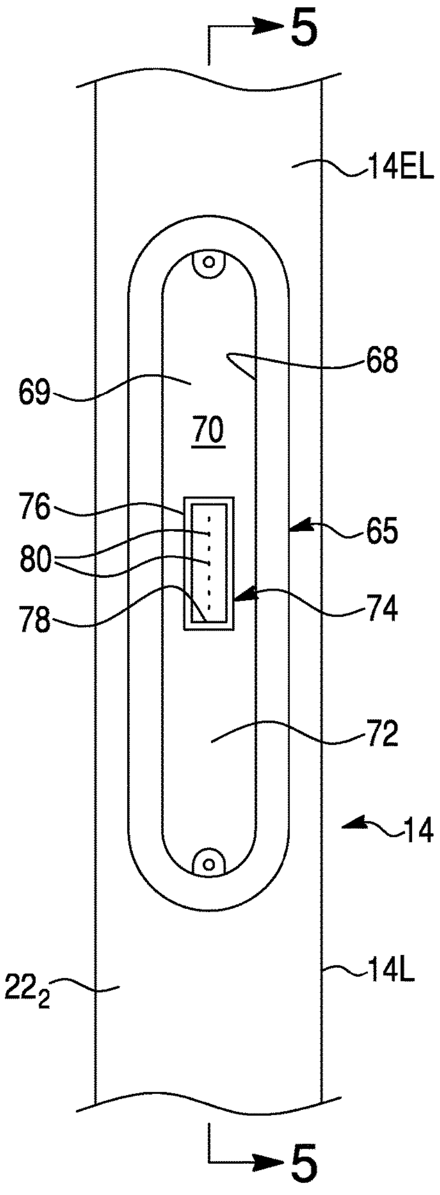
FIG. 4 is a partial elevational view of an edge of a latch side of the door.
Figure 5:
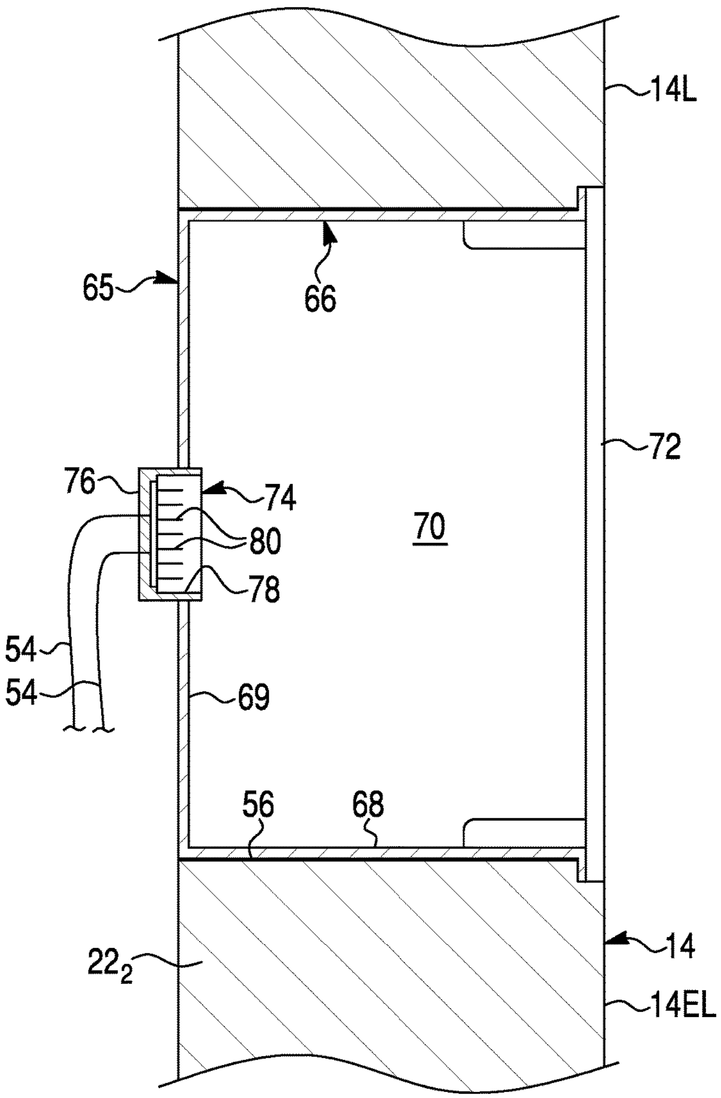
FIG. 5 is a cross-sectional view of a second stile of the door taken along the lines 5-5 in FIG. 4.
Figure 8:
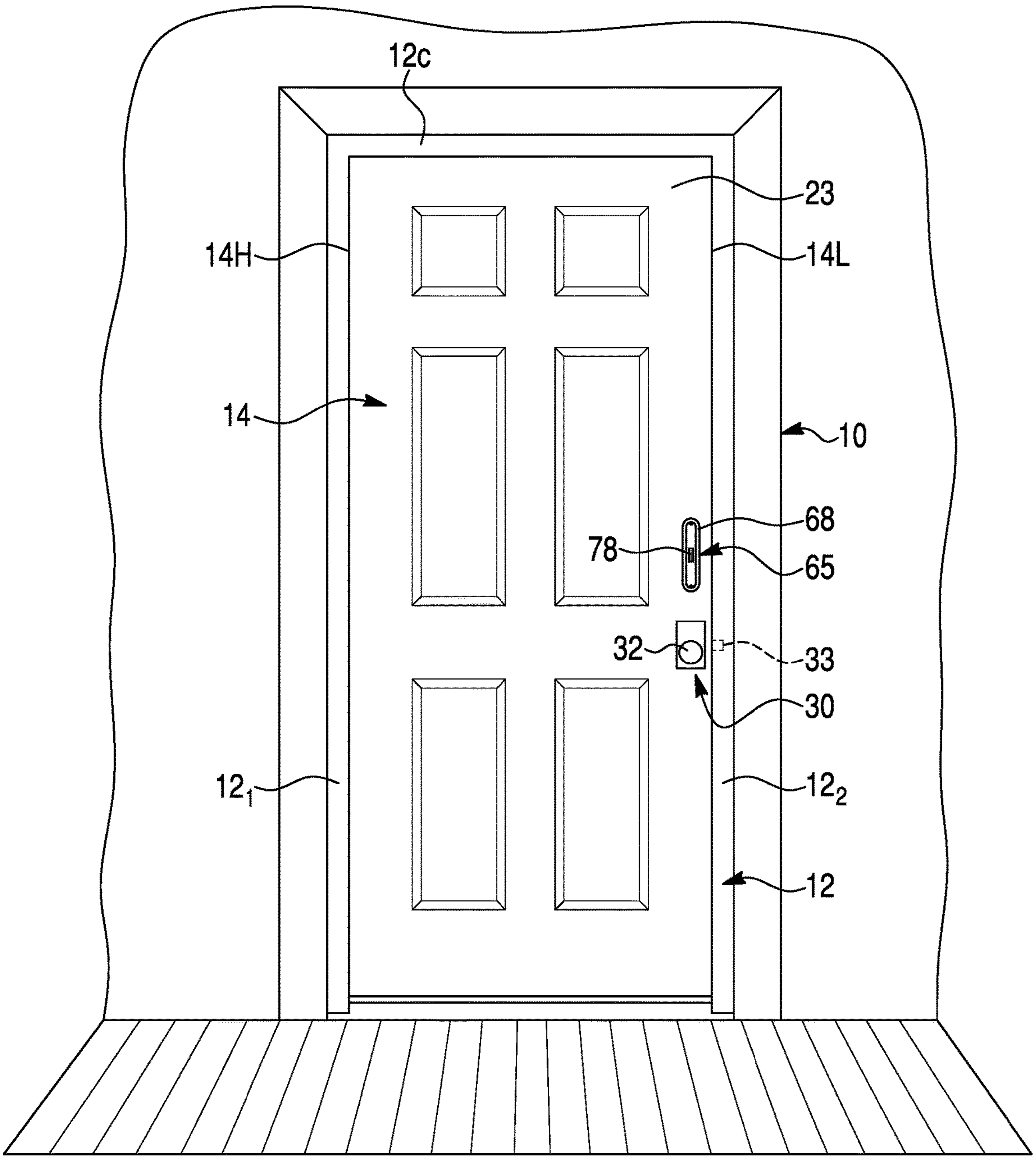
FIG. 8 is an elevational view of another embodiment.
Figure 9:
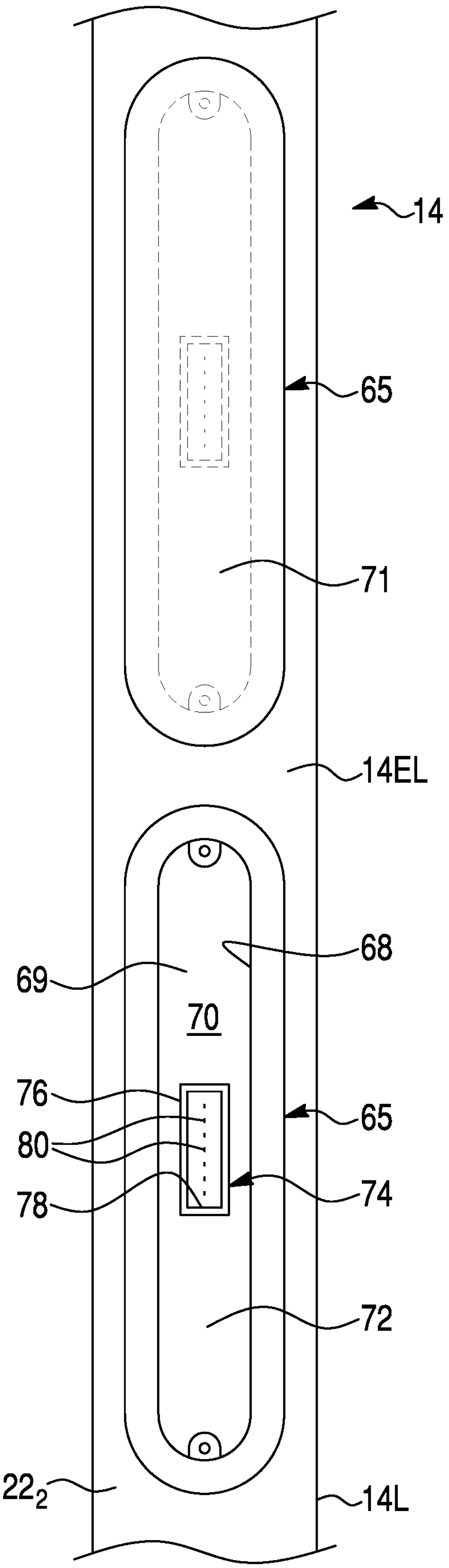
FIG. 9 is an exploded view illustrating spaced receptacles according to the invention.

The door 14 is constructed with at least one pre-wired receptacle 65 in which one of the electric devices 30, 36 and/or the battery 50 is releasably mounted. Specifically, one of the electric devices 30, 36 and/or the battery 50 can be removably (or releasably) plugged into the peripheral edge of the door 14, such as into edge 14EL of the latch side 14L of the door 14. The receptacles 65, best shown in FIGS. 4 and 5, each comprises an insulated housing 66 having a continuous side wall 68 and a bottom wall 69 so as to define an open cavity 70 configured to receive one of the electric devices therein. Thus, the housing 66 of the receptacle 65 has an opening 72 into which one of the electric devices 36 or the powered door latch 30 slides into the cavity 70 of the receptacle 65. As best shown in FIGS. 4 and 5, the prewired receptacle 65 opens on the peripheral edge of the latch stile 22$_2$. Alternatively, the prewired receptacle 65 may open on the facings 23, 24 of the door 14, as best shown in FIG. 8. Plural receptacles 65, as best shown in FIG. 9, may be provided to house plural electric devices.

The housings 66 of the receptacles 65 are molded from a flame retardant polymer or other suitable material that meets the necessary UL and regulatory requirements for housing electrical devices. Ventilation preferably is provided to aid in heat transfer, or a conduit may be connected to the receptacles 65 and vent air out a top of the door 14. The receptacle 65 further comprises a multi-pin electrical socket (or female end) connector 74 including a connector housing 76 defining a socket 78, and a plurality of pins 80 electrically connected to the AC/DC converter 40 through the low-voltage electrical wires 54 of the electrical wire system. While a socket/pin system is shown, those skilled in the art will recognize that various other electrical connector systems, such as USB or HDMI, may be utilized to provide electric power to the associated electric device 36, to allow data transmission from them, and to receive an operating signal, such as to actuate electric powered lock 30.

According to the first exemplary embodiment of present invention, the receptacle 65 is inserted into one of the slots 56 in the latch stile 22$_2$ of the door 14 as best shown in FIGS. 4 and 5, and fixed therein. Preferably, each of the electric devices 36$_1$-36$_4$ and the electric powered door latch 30 has a pin-hole electrical plug (or male end) connector complementary to the multi-pin socket connector 74. The pin-hole electrical plug connector includes a plurality of pin-holes complementary to the pins 80 of the multi-pin electrical socket connector 74. Other electrical connection mechanisms may also be utilized, as noted above. Thus, the electrical plug connector of each of the electric devices 36$_1$-36$_4$ and the electric powered door latch 30 are removably (or detachably, releasably) connectable into the multi-pin electrical socket connector 74 of the receptacle 65 so that the low-voltage electric power can be supplied for use and functioning of the electric devices 36$_1$-36$_4$ and the electric powered door latch 30. Each of the electric devices 36$_1$-36$_4$ and the electric powered door latch 30 thus can be inserted and plugged into the multi-pin electrical socket connector 74 of the associated receptacle 65. Alternatively, the receptacle 65 may comprise the pin-hole electrical plug connector, while each of the electric devices 36$_1$-36$_4$ and the electric powered door latch 30 may comprise the multi-pin electrical socket connector.

The pre-wired receptacle 65 may have a flange or some other unique mechanical identifier associated therewith to mate with a complementary receptacle of each of the electric devices 30 or 36 in order to identify the electrical plug connector and thus its electric device 30 or 36 as approved for use with the pre-wired receptacle 65. Alternatively, the electric devices 30 or 36 may have an electronic signature, electronic handshake or some other electrical identifier to assure that the electric device 30 or 36 is approved for installation. The door system 10 further comprises the electrical or mechanical identifier associated with each of the receptacles 65 and adapted for identifying the DC electric devices 30 or 36 authorized to be mounted within the associated pre-wired receptacle 65. Assuring that the electric devices are approved assures proper operation of the electric devices, maintains regulatory and UL compliance, and minimizes maintenance issues that might arise if unapproved electric devices could easily be installed onto the door system 10.

The receptacles 65 may each be closed on the open side by a removable cover or have a cut-out portion to allow access to electric devices of various size, as best shown in FIG. 9. Cover 71 is removable from the body of receptacle 65, such as through a snap-fit connection, line of weakness, or similar mechanism allowing the cover 71 to be removed from receptacle 65 in order to allow mounting of an electric device therein in electrical connection with ECU 58.

Preferably, the battery 50, the power management controller 58, the sensors, the electric powered door latch 30 and/or at least some of the electric devices $36_1$-$36_4$ are mounted into the edge of the latch side 14L of the door 14 in the prewired receptacles 65 for integration, modularization and serviceability. Further preferably, the battery 50, the power management controller 58, and the sensors, similarly include a pin-hole or other electrical connector adapted to be inserted and plugged into the connector 74 of the receptacle 65.

The power management controller 58 controls the electric powered door latch 30 and the electric devices $36_1$-$36_4$, as well as other electrically operated devices in door system 10. Accordingly, the power management controller 58 may be in communication with the electric powered door latch 30 and the electric devices $36_1$-$36_4$ through ethernet communication including data links $60_1$, $60_2$, $60_3$, $60_4$ and 60L. As best shown in FIG. 3, the data link $60_4$ extends through the powered hinge $16_1$ or power transfer device. Alternatively, the central ECU 58 may be in communication with the electric powered door latch 30 and the electric devices $36_1$-$36_4$ through one of the following wireless technologies: Bluetooth®, Wi-Fi, LAN, mobile telecommunications technology (3G, 4G or 5G), etc.

The power management controller 58 also controls operation of the electric powered door latch 30. The electric powered door latch 30 includes an electric latch operator, which may be used to lock the door 14 based upon input signals received from the power management controller 58. The central ECU 58 may allow the electric powered door latch 30 to be unlatched remotely, such as through a smartphone app operated by the home owner, without the intervention of a person wishing to enter the building. To unlatch the door 14, the electric latch operator moves the central latch bolt 33 of the electric powered door latch 30 by an electric motor associated with the electric latch operator of the electric powered door latch 30 into the retracted position. Thus, the power management controller 58 with the data links $60_1$, $60_2$, $60_3$, $60_4$ and 60L defines a power management system for the door system 10.

The door system 10 can be configured by a user to enable both local and cloud integration and data storage. Specific examples where a user can configure setting of the door system 10 include:

- using motion sensors to turn on LED lighting, such as the threshold LED light $36_3$ or the hallway illumination light $36_4$;
- using motion sensors to control the electric powered door latch 30;
- using connected door lock sensors and video sensors to detect a user attempting to unlock the door 14;
- using door state changes to activate home automation sequences, such as turning on interior lighting or for an announcement of occupancy; and
- using motion sensors as a trigger for smart glass of a door lite of the door 14 to turn opaque for privacy.

Those skilled in the art will recognize that the sensors communicating with the power management controller 58 may be located on the building, the door frame 12 and/or the door 14 provided they are in communication with the power management controller 58.

Also, the power management controller 58 may notify a user that securing the door latch 30 is not possible due to the door 14 being ajar or open. For this purpose, the door assembly 10 may have a door state sensor (or door sensor) 64 wirelessly communicating with the power management controller 58, as best shown in FIG. 3. The door state sensor 64 monitors if the door 14 is ajar or closed (i.e., if the door 14 is properly aligned with the frame assembly 12) prior to the ECU 58 activating the electric powered door latch 30. A signal from the door state sensor 64 indicating that the door 14 is ajar is directed to the power management controller 58 that, in turn, activates the electric door operator 52 to properly close the door 14 so that thereafter the electric powered door latch 30 may operate to lock the door 14.

The ECU 58 is in electrical connection with battery 50. The ECU 58 may determine that the battery is depleted and requires replacement, and notify the user through a smartphone app or local controller that the battery 50 needs to be replaced. In the event that the battery 50 includes a charger, the ECU 58 monitors the battery 50 and operates the associated charger to assure sufficient charge of the battery 50 and/or to notify the user when the battery 50 is no longer able to hold a charge.

According to the present invention, the AC powered door closer 52 and the door state sensor 64, such as a Hall-effect sensor, interact to close the door 14 when the door state sensor 64 determines that the door 14 is open. Operation of the electric powered latch 30 when the door 14 is not properly closed may damage the latch 30. It should be understood that capabilities of the door state sensor 64 may contemplate various "states" of the door or the DC electric devices, i.e., locked/unlocked, open/closed, lights on/off, etc., but should also sense problems with the DC or AC electric devices themselves, for example, no Wi-Fi or Bluetooth signal, too much power draw, not enough power draw, too hot, too cold, (for a back-up battery 50, for example), etc. The sensors 62, 64 and other sensors communicate signals to power management controller 58, which then determines the action to take in response to the signals, and issues a command to the appropriate electric device 36. In this way, the door state sensor 64 may send a signal to power management controller 58 that the door 14 is open, and the power management controller 58 may issue a command to door closer 52 to operate to close the door 14 and, after receiving a closed door signal from sensor 64, send a signal to door closer 52 to close the door. The door open signal may be communicated by the door state sensor 64, such as on a periodic basis, but may be in response to an inquiry, such as from the owner through use of a smartphone app.

Similarly, one or more sensors may be provided to not only turn-on the LED light(s) but allow the electric powered door lock 30 to lock after determining that the individual has passed through the door 14 and the door 14 is closed, to communicate with a smartphone app to allow the owner to monitor activity around the door 14, to determine the status of the door 14, whether open or closed, and to determine whether someone is approaching the door 14.

The power management controller 58 may work both locally amongst the electric devices 36, as well as be supplemented by cloud integration for more advanced control while the user is away from the home control system. In the door system 10, a user may access the power system of the door system 10 via a wireless connection, a PC or a mobile device, such as through a smartphone app, to set up, configure and manage one or more power connected electric devices 36. Moreover, a user may access data and have user settable options for both addition of electric devices as well as the diagnostic health of the attached electric devices and/or the battery that would be a more efficient method to service issues that may have occurred with the electric devices and the battery. The smartphone app may be used to monitor activity around the door 14, to activate the electric powered door lock 30 to lock and unlock, and to determine the status of the door 14, whether open or shut.

Figure 6:
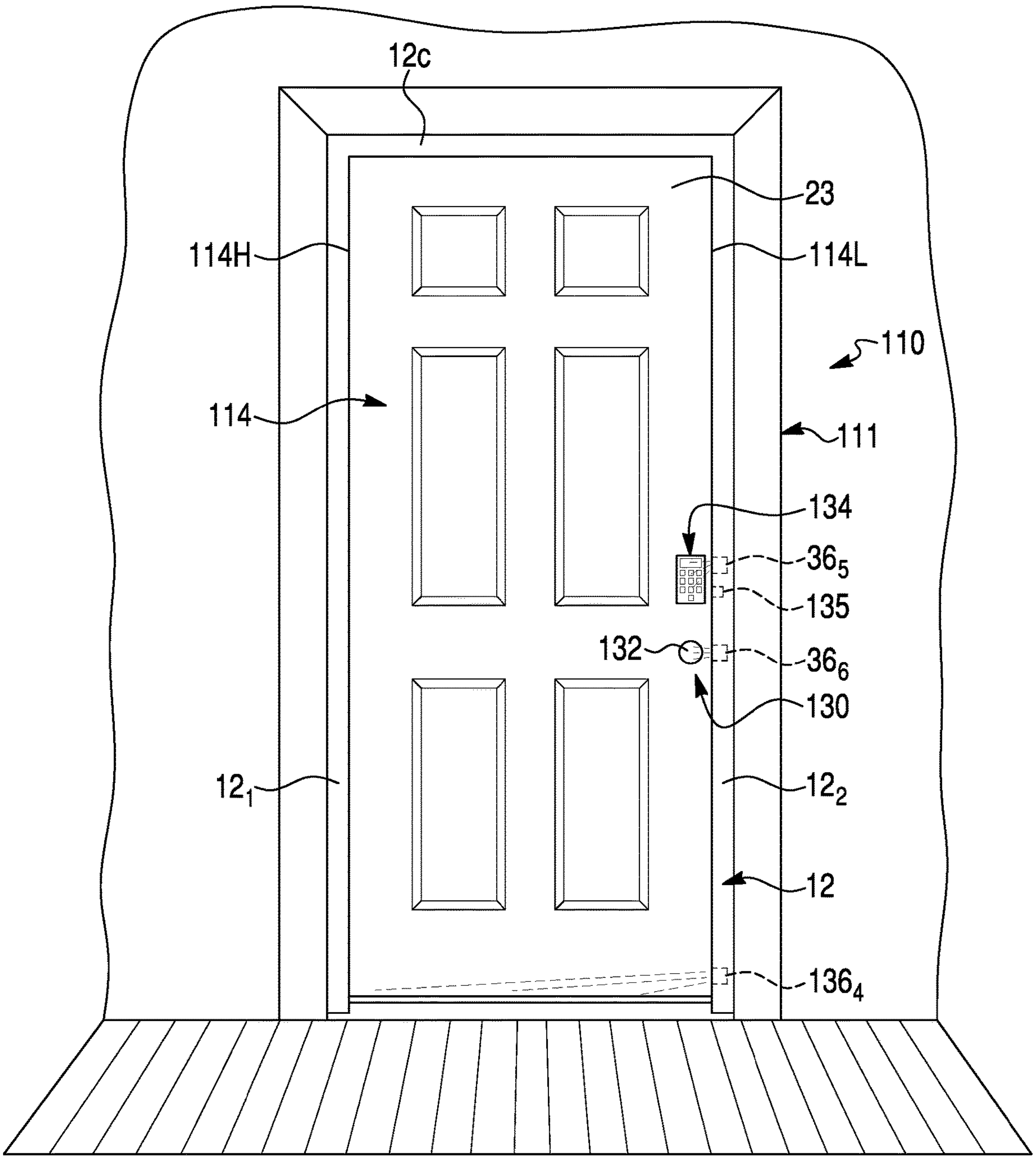
FIG. 6 is an elevational exterior view of an exterior door system according to a second exemplary embodiment of the present invention.
Figure 7:
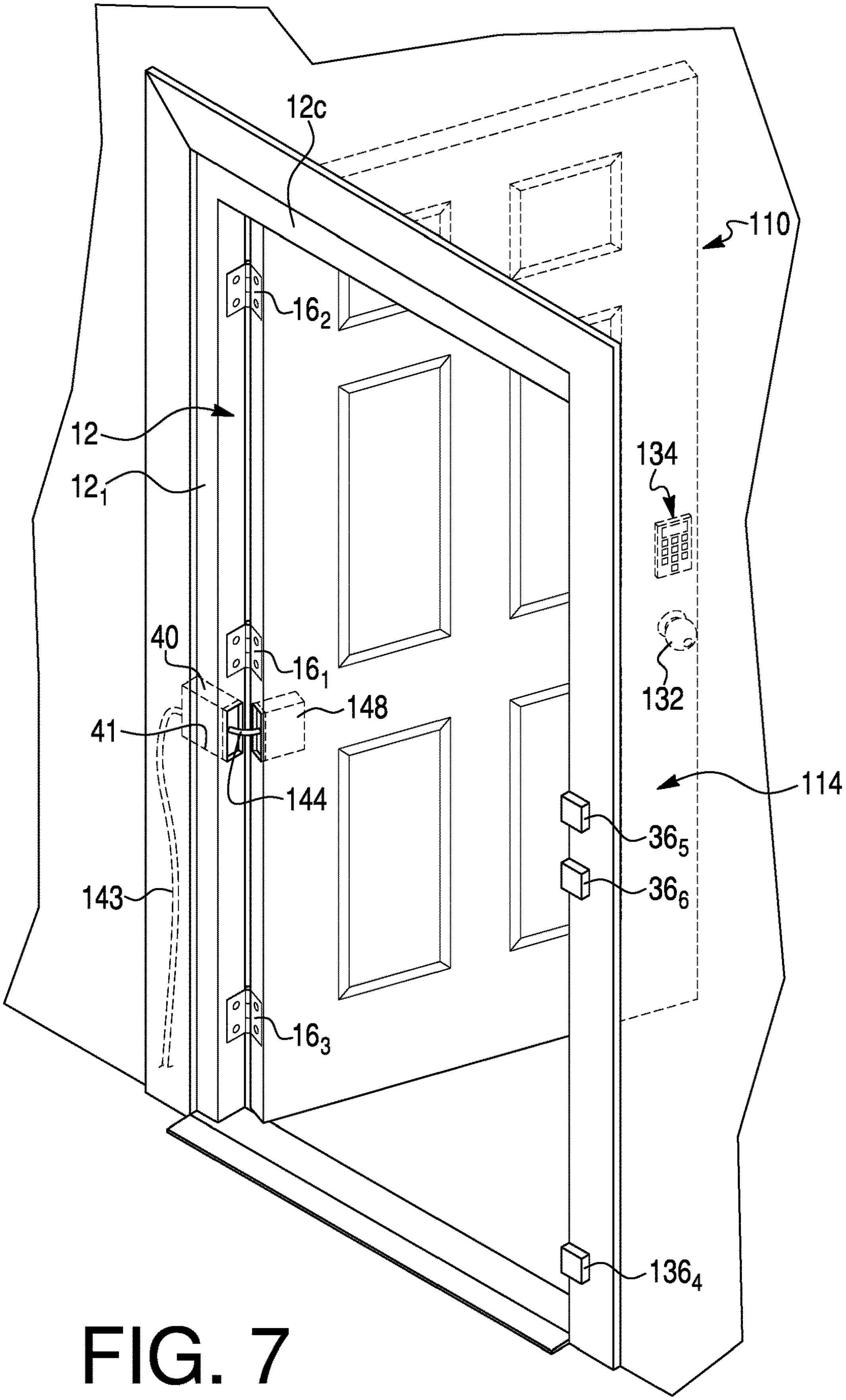
FIG. 7 is a perspective view of the exterior door system according to the second exemplary embodiment of the present invention with an open door.

FIGS. 6 and 7 illustrate a door system, generally labeled with the reference numeral 110, according to a second exemplary embodiment of the present invention. Components, which function in the same ways as in the first exemplary embodiment of the present invention depicted in FIGS. 1-5 are labeled with the same reference characters. Components, which are constructed similar to or function in the same way as in the first exemplary embodiment are designated by the same reference numerals or by the reference numerals to which 100 has been added, sometimes without being described in detail since similarities between the corresponding parts in the two embodiments will be readily perceived by the reader.

As illustrated in FIGS. 6 and 7, the door system 110 comprises a substantially rectangular door frame 12 and a door 114 pivotally attached thereto by at least one hinge $\mathbf{16}_1$, such as "butt hinge" that includes two leaves. Preferably, the door system 110 comprises three hinges $\mathbf{16}_1$, $\mathbf{16}_2$, $\mathbf{16}_3$ used to pivotally attach the door 114 to the door frame 12. The door system 110 further comprises a plurality of DC electric devices (components) integrated into the door system 110. The DC electric devices are mounted to the door 114 or to the door frame 12 of the door system 110, such as through a plug system of the type illustrated in FIGS. 4-6. to provide functions, such as electronic access control, door state feedback, entry camera and audio/video communication, etc. Specifically, the DC electric devices that are mounted to the door 114 of the door system 110 include, but are not limited to, a keypad electronic door lock 134 with a deadbolt 135, while the DC electric devices that are mounted to the door frame 12 or even adjacent to the frame 12 on a wall of the building include, but are not limited to, a threshold illumination light $\mathbf{136}_4$, a door lock illumination light $\mathbf{36}_5$, and a doorknob illumination light $\mathbf{36}_6$ for illuminating a doorknob (or handle) 132 of a manual or electric powered door latch 130. While the lights $\mathbf{136}_4$, $\mathbf{36}_5$, and $\mathbf{36}_6$ are shown mounted to the exterior of frame 12, they may be mounted in pockets formed into the frame 12 in order to be recessed and not easily accessible, such as to an intruder. While we illustrate the door lock 134 and the door latch 130 being separate devices that are spaced apart, they may be integrated into a single unit.

As illustrated in FIG. 7, the door system 110 further comprises a low voltage (such as 5 volts (V), 12 volts, 24 volts or other required voltage) AC/DC converter 40 mounted to the door frame 12. Alternatively, the low voltage AC/DC converter 40 may be disposed outside the door assembly 111, such as at the wall adjacent the frame 12. According to the present invention, as best illustrated in FIG. 7, the low voltage AC/DC converter 40 is located in a pocket (or slot) 41 machined or otherwise formed into the first jamb member $\mathbf{12}_1$ of the door frame 12 so that the low voltage AC/DC converter 40 is accessible from outside of the first jamb member $\mathbf{12}_1$ of and removably mounted in the pocket 41. The low voltage AC/DC converter 40 is electrically connected by high voltage electrical cable 143 to a 115 (or 120) V AC power unit installed during home construction and located outside the door system 110.

Further according to the second exemplary embodiment, the AC/DC converter 40 is electrically connected to a DC power distribution system 148 by an electric power transfer device, such as by an armored cable 144 provided to transmit low voltage DC power, data, electric signals, or a combination thereof. Preferably the pockets in which the AC/DC converter 40 and the distribution system 148 are positioned are sized sufficiently to allow the armored cable 144 to be retained between them when the door 114 is closed and will not impede closing of the door 14.

Therefore, a pre-wired door system according to the present invention includes a power system and a door power management system and has the ability to provide both high-voltage and low-voltage electrical power for operation of a plurality of electric devices and a power management controller integrated into the door system. For the plurality of the electric devices integrated in the door system, the range of watts required, considering amperes and volts specifically required by each of the electric devices and use, varies widely from LED lighting at the low end, 2.9 watts per foot at 5 volts, to electromechanical door systems requiring extremely high amp output to move a door, typically over 500 watts at 120 volts. Thus, the present invention provides two or more power supply options that better match power needs of electric devices to allow for easier integration and power management given the diversity of power requirements.

By providing a convenient way to integrate the electric devices (hardware) into the door system with power available, manufacturers of the electric devices can simplify the designs and provide consumers with cleaner designs that are hidden and integrated into the door and do not require replacement of batteries. Furthermore, the invention enables integration of the electric devices into the door system in a standardized way through electrical connectors that allows convenient serviceability of the electric devices. The electric devices are integrated into the pre-wired door system according to the present invention so that the door maintains structural integrity, insulation performance, and is free of distortion or other aesthetic defects. In addition, having the components embedded in the door make them better protected from harsh environments making them safer and reliable for use by consumers.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A door system, comprising:

a door frame adapted to be mounted within an opening; a door pivotally attached to the door frame;

an AC/DC converter configured to be electrically connected to an AC power unit operably associated with the door system;

a pre-wired receptacle in the door, the pre-wired receptacle comprising an electrical connector electrically mounted in an open cavity of the pre-wired receptacle and electrically connected to the AC/DC converter located in a slot formed in a first jamb member of the door frame, wherein the electrical connector and the open cavity is configured to receive a specific DC electric device out of a plurality of different DC electric devices utilizing a flange, mechanical identifier, electronic identifier or software so as to identify or designate that the specific DC electric device is approved for use with the door system and such that the specific DC electric device can removably slide into the open cavity while mating with that mounted electrical connector; and the specific DC electric device removably disposed in the open cavity of the pre-wired receptacle and electrically connected to the AC/DC converter located in the first jamb member of the door frame through the mounted electrical connector of the pre-wired receptacle.

2. The door system of claim 1, wherein the electrical connector comprises one of a plug connector and socket connector.

3. The door system of claim 2 wherein a slot is formed in a peripheral edge of the door and wherein the pre-wired receptacle is disposed in the slot formed in the peripheral edge of the door.

4. The door system of claim 3, wherein the door comprises an inner door frame including top and bottom rails and first and second stiles, and wherein the slot formed in the peripheral edge of the door is formed in one of the stiles or rails.

5. The door system of claim 4, wherein the slot formed in the peripheral edge of the door opens on the peripheral edge of one of the stiles or rails.

6. The door system of claim 1, wherein the DC electric device comprises one of a powered door latch, a sensor, a door state sensor, and a LED.

7. The door system of claim 2, wherein the receptacle opens on a facing of the door.

8. The door system of claim 7, wherein the DC electric device comprises one of a powered lock, a sensor, a door state sensor, a LED, a video camera, a lighted key hole, and a video camera.

9. The door system of claim 1, wherein:

a plurality of pre-wired receptacles are formed in the door and/or door frame, each of the receptacles has a connector and is in electrical connection with the AC/DC converter, and a plurality of DC electric devices, each of the DC electric devices releasably mounted within one of the receptacles and in electrical connection with the AC/DC converter through the associated connector.

10. The door system of claim 9, wherein at least one of the receptacles is formed in a peripheral edge of the door and at least one of the receptacles is formed in a surface of the door and/or door frame.

11. The door system of claim 10, wherein the DC electric device comprises one of a powered lock, a sensor, a door state sensor, a LED, a video camera, a lighted key hole, and a video camera.

12. An entryway, comprising:

a door frame within an opening;

a door pivotally attached to the door frame;

an AC power supply operably associated with the door frame;

an AC/DC converter located in a slot formed in a first jamb member of the door frame and electrically connected to the AC power supply;

a DC power distribution system mounted to the door or door frame and electrically connected to the AC/DC converter;

a plurality of DC electric devices mounted to the door or door frame and electrically connected to the DC power distribution system; and a pre-wired receptacle disposed in a slot, the pre-wired receptacle comprising an electrical connector mounted in an open cavity of the pre-wired receptacle and electrically connected to the DC power distribution system, wherein the electrical connector and the open cavity is configured to receive a specific DC electric device out of a plurality of different DC electric devices utilizing a flange, mechanical identifier, electronic identifier or software so as to identify or designate that the specific DC electric device is approved for use with the door system and such that the specific DC electric device can removably slide into the open cavity while mating with that mounted electrical connector; and at least one of a specific DC electric devices selected from the plurality of DC electric devices removably mounted in the open cavity of pre-wired receptacle and electrically connected to the AC/DC converter through the electrical connector of the pre-wired receptacle;

wherein there are a plurality of pre-wired receptacles each comprising an electrical connector, at least one of the pre-wired receptacles opens on a facing of the door.

13. The entryway of claim 12, wherein:

at least one of the pre-wired receptacles opens on a peripheral edge of the door or a slot in the door frame.

14. The entryway of claim 13, wherein the door includes top and bottom rails and first and second stiles, and wherein at least one of the pre-wired receptacles is formed in one of the stiles or rails and opens on the peripheral edge of the door or the slot in the door frame thereof.

15. The entryway of claim 14, wherein a DC electric device comprises one of a powered lock, a sensor, a door state sensor, a LED, a video camera, a lighted key hole, and a video camera.

16. The entryway of claim 15, further comprising an electrical or mechanical identifier associated with each of the pre-wired receptacles and adapted for identifying DC electric devices authorized to be mounted within the associated pre-wired receptacle.

17. The entryway of claim 16, wherein each of the electrical connectors has a first electrical connector element and each of the DC electric devices has a complementary second electrical connector element.

18. The entryway of claim 17, wherein the first electrical connector element is one of a male and female element, and wherein the second electrical connector element is a complementary male or female element.

19. The entryway of claim 12, wherein at least one of the DC electric devices operate at a voltage less than the voltage of the AC power supply.

20. The entryway of claim 19, further comprising an AC-powered device operably associated with the door frame and engageable with the door and electrically connected to the AC power supply, wherein the AC-powered device is adapted to pivot the door to a closed position.

21. The entryway of claim 15, further comprising a controller, wherein the controller is electrically connected to the DC distribution system and in communication with at least one of the DC electric devices for controlling operation of the associated DC electric device.

22. The entryway of claim 21, wherein:

there are a plurality of sensors, at least one of the sensors is operably associated with the door frame and in communication with the controller, the controller is configured to receive a signal from the at least one sensor and for controlling operation of an associated DC electric device in response to a signal from the at least one sensor.

23. The entryway of claim 22, wherein the controller is configured to supply DC power from the DC power distribution system to at least one of a DC electric devices, to receive data from at least one of the DC electric devices, and to supply a command signal to at least one of the DC electric devices in response to the received signal.

24. The entryway of claim 23, wherein at least one of the sensors is in wireless communication with the controller.

25. The entryway of claim 22, wherein data is wirelessly transmitted from at least one of the electric devices to the controller.

* * * * *